United States Patent
Zhao et al.

(10) Patent No.: US 8,208,884 B2
(45) Date of Patent: Jun. 26, 2012

(54) METHOD AND SYSTEM FOR FM TUNER GROUND ISOLATION WHEN USING GROUND SIGNAL LINE AS FM ANTENNA

(75) Inventors: Tian Zhao, Austin, TX (US); Greg Allan Hodgson, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 258 days.

(21) Appl. No.: 12/589,742

(22) Filed: Oct. 28, 2009

(65) Prior Publication Data

US 2011/0098008 A1  Apr. 28, 2011

(51) Int. Cl.
*H04B 7/00* (2006.01)

(52) U.S. Cl. .................................. 455/270; 455/277.1

(58) Field of Classification Search .................. 455/269, 455/270, 272, 273, 274, 275, 277.1, 280, 455/556.1, 575.1, 569.1, 569.2, 575.7
See application file for complete search history.

(56) References Cited

U.S. PATENT DOCUMENTS

| | | | |
|---|---|---|---|
| 4,369,521 A * | 1/1983 | Sawada | 455/270 |
| 4,987,391 A | 1/1991 | Kusiak, Jr. | 333/12 |
| 6,272,328 B1 | 8/2001 | Nguyen et al. | 455/277.1 |
| 7,292,705 B2 * | 11/2007 | Harano | 381/384 |
| 7,525,502 B2 | 4/2009 | Hui et al. | 343/835 |
| 7,574,187 B2 * | 8/2009 | Hyatt et al. | 455/270 |
| 7,840,242 B2 * | 11/2010 | Yoshino | 455/575.2 |
| 7,889,139 B2 | 2/2011 | Hobson et al. | 343/702 |
| 2005/0152535 A1 * | 7/2005 | Cohen et al. | 379/430 |
| 2008/0233911 A1 * | 9/2008 | Baker et al. | 455/205 |
| 2009/0252348 A1 * | 10/2009 | Glissman | 381/107 |
| 2010/0283710 A1 | 11/2010 | Lutman et al. | 343/906 |

* cited by examiner

*Primary Examiner* — Blane J Jackson
(74) *Attorney, Agent, or Firm* — O'Keefe, Egan, Peterman & Enders, LLP

(57) ABSTRACT

Methods and systems are disclosed that utilize FM tuner ground isolation when using a ground signal line as an FM antenna for an FM tuner integrated circuit (IC) within a portable electronic system. The ground isolation can be implemented, for example, using one or more isolation elements, such as ferrite beads, coupled between the FM tuner ground and the device ground. The ferrite beads can also be coupled between other pins for the FM tuner and the device circuitry. A car lighter adapter (CLA) coupled to the device circuitry can be configured to provide a ground signal line for use as an antenna for the FM tuner IC. Further, signal lines on a printed circuit board (PCB) can also provide a ground signal line for use as an antenna for the FM tuner IC. The device can also be as a personal navigation device.

20 Claims, 3 Drawing Sheets

METHOD AND SYSTEM FOR FM TUNER GROUND ISOLATION WHEN USING GROUND SIGNAL LINE AS FM ANTENNA

TECHNICAL FIELD OF THE INVENTION

This invention relates to radio frequency communications and, more particularly, to integrated FM receivers, transmitters and transceivers.

BACKGROUND

Integrated circuits exist that are configured to receive and/or transmit radio frequency (RF) signals. More particularly, there are such integrated circuits that are configured to receive and/or transmit RF signals in the FM audio broadcast band. Further, some FM broadcast integrated circuits are included within other electronic devices. For reception of FM signals, it is often desirable to have an antenna to help receive those FM signals.

For an in-car portable electronic system (e.g., personal navigation device (PND)) with an FM tuner, the car lighter adapter (CLA) ground signal line has been previously used as an antenna for the FM tuner. However, where this is done, an inductive component is typically required to isolate the CLA ground from the portable electronic system ground, which is also the FM tuner ground. Because there is significant amount of current flowing through the CLA ground, it is inevitable that the isolation inductor must be large and bulky in size. This size problem poses significant design constraint in adopting the CLA ground as the FM antenna.

FIG. 2 (Prior Art) is a circuit diagram 200 where the ground signal line for a CLA is used as an antenna for an FM tuner that is part of a device, such as a PND. The CLA includes a connector 204 that is configured to be inserted into a lighter within a vehicle. The CLA also includes a power signal line ($CLA_{PWR}$) 222 and a ground signal line ($CLA_{GND}$) 220 that are coupled to a device power supply 202. The device power supply 202 then provides a supply voltage 208 and a ground 210 to the device. The supply 208 is used to power the device and to provide a supply voltage (Vcc) to the FM tuner integrated circuit (IC) 206. The ground 210 is used to provide the device ground 212 and the FM tuner ground 207. The RF input (RF IN) 205 for the FM tuner IC 206 is coupled to the CLA ground ($CLA_{GND}$) signal line 220 through capacitor (C1) 214. In addition, an inductor (L1) 216 is coupled between the connector 204 and the device power supply 202 in series along the CLA ground ($CLA_{GND}$) signal line 220 above the node where the capacitor (C1) 214 connects to the CLA ground ($CLA_{GND}$) signal line 220. A shunt inductor (L2) 218 is also coupled between the RF input (RF IN) 205 and the device ground 212. As indicated above, for this embodiment, the inductor (L1) 216 is typically required to be relatively large and is undesirable in a portable system.

SUMMARY OF THE INVENTION

Methods and systems are disclosed that utilize FM tuner ground isolation when using a ground signal line as an FM antenna for an FM tuner integrated circuit (IC) within a portable electronic system. The ground isolation can be implemented, for example, using one or more isolation elements, such as ferrite beads, coupled between the FM tuner ground and the device ground. The ferrite beads can also be coupled between other pins for the FM tuner and the device circuitry.

In one embodiment, a portable electronic system is disclosed that includes device circuitry having a device ground including a ground signal line, an FM tuner integrated circuit (IC) having a tuner ground and a radio frequency (RF) input where the RF input is coupled to use the ground signal line as an antenna and where the FM tuner IC is configured to tune RF signals received at the RF input through the ground signal line, and an isolation element coupled between the device ground and the tuner ground to provide ground isolation for the FM tuner IC. Further, a car lighter adapter coupled to the device circuitry can be configured to provide an adapter ground signal line that is used as an antenna for the FM tuner IC. Still further, the isolation element can be implemented as a ferrite bead coupled between the device ground and the tuner ground. In addition, the device circuitry can include circuitry on a printed circuit board (PCB), and printed signal lines on the PCB can be the ground signal lines used as an antenna for the FM tuner IC. The device circuitry can also be configured to operate as a personal navigation device.

Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
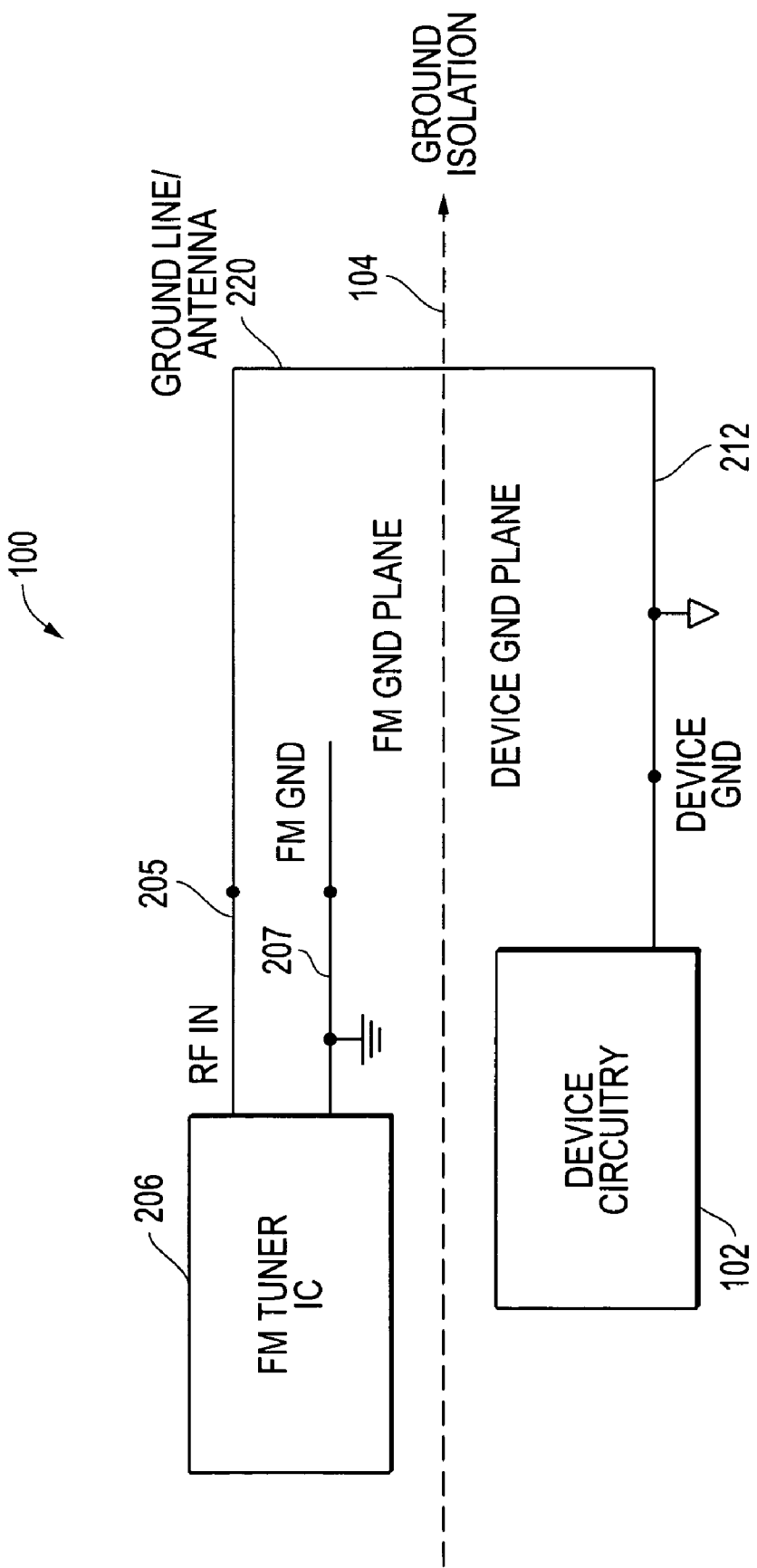
FIG. 1 is a block diagram an embodiment where isolation is provided between the device ground and the FM tuner ground.

Methods and systems are disclosed that utilize FM tuner ground isolation when using a ground signal line as an FM antenna for an FM tuner integrated circuit (IC) within a portable electronic system. The ground isolation can be implemented, for example, using one or more isolation elements, such as ferrite beads, coupled between the FM tuner ground and the device ground. The ferrite beads can also be coupled between other pins for the FM tuner and the device circuitry. Other features and variations could also be implemented, as desired, and related systems and methods can be utilized, as well.

The embodiments described herein, therefore, provide isolation between the device ground and FM tuner ground so that large isolation inductors can be avoided where the device ground signal line is used for an FM antenna. This isolation eases design, constraints, for example, when using a car lighter adapter (CLA) ground as an FM antenna for in-car portable electronic system with an FM tuner integrated circuit (IC). Further, even if the CLA is detached, the ground lines on the PCB (printed circuit board)) for the portable electronic system can still function as an electrically small antenna and pick up available FM signals for the FM tuner integrated circuit (IC).

Advantageously, with respect to the embodiments described herein, the FM tuner is on a separate ground plane from the device ground plane. The RF input for the FM tuner IC is attached to a small shunt inductor ($L_2$) for impedance matching and a DC blocking capacitor ($C_1$). The FM tuner is then attached to the portable electronic system, such as an in-car portable electronic system with a CLA, through one or more isolation elements. These isolation elements can be, for example, ferrite beads (BD). These ferrite beads can be coupled between the FM tuner IC pins (e.g., power, ground, control) and the corresponding signals lines for the device circuitry. The DC blocking capacitor ($C_1$) is coupled between the device ground and the RF input for the FM tuner IC. When a CLA is being used, the ground signal line for the CLA can be used as the antenna for the FM tuner IC. If no CLA is used, signal lines on the PCB for the device circuitry can be used as an electrically small antenna. Further, one example of a device that can utilize this ground isolation is a portable personal navigation device (PND).

In operation, where a CLA is connected, the FM tuner IC uses the ground signal line for the CLA as the FM antenna. Because the FM tuner is isolated from the device ground, the CLA ground signal line will appear as a high-impedance node to the tuner ground. The CLA ground signal line, therefore, can be used directly as the FM antenna. Because there will be no significant current going through the ferrite beads, the physical size of the ferrite beads can be small, and no large inductor ($L_1$) is required as with the prior art solutions.

It is noted that the FM tuner IC can be, for example, an FM tuner IC available from Silicon Laboratories, Inc., such as the Si4706. The device can be, for example, a personal navigation device (PDN), or other in-car portable electronic system, that is configured to be portable and to be operated within a vehicle using a rechargeable battery and/or a CLA to provide power through the car systems. The ground isolation embodiments disclosed herein could also be used with other portable systems that desire to use a signal line associated with a device ground to provide an FM antenna for an FM tuner IC.

FIG. 1 is a block diagram for an embodiment 100 where ground isolation 104 is provided between the FM ground (GND) 207 for the FM tuner IC 206 and the device ground (GND) 212 for the device circuitry 102. As such, the FM ground plane is isolated from the device ground plane. A signal line 220 coupled to the device ground 212 can then be coupled to the RF input (RF IN) 205 and used as the FM antenna for the FM tuner IC 206. Further, due to this ground isolation 104, the embodiment 100 no longer needs the large isolation inductor (L1) required by the prior solution of FIG. 2 (Prior Art).

Figure 3:
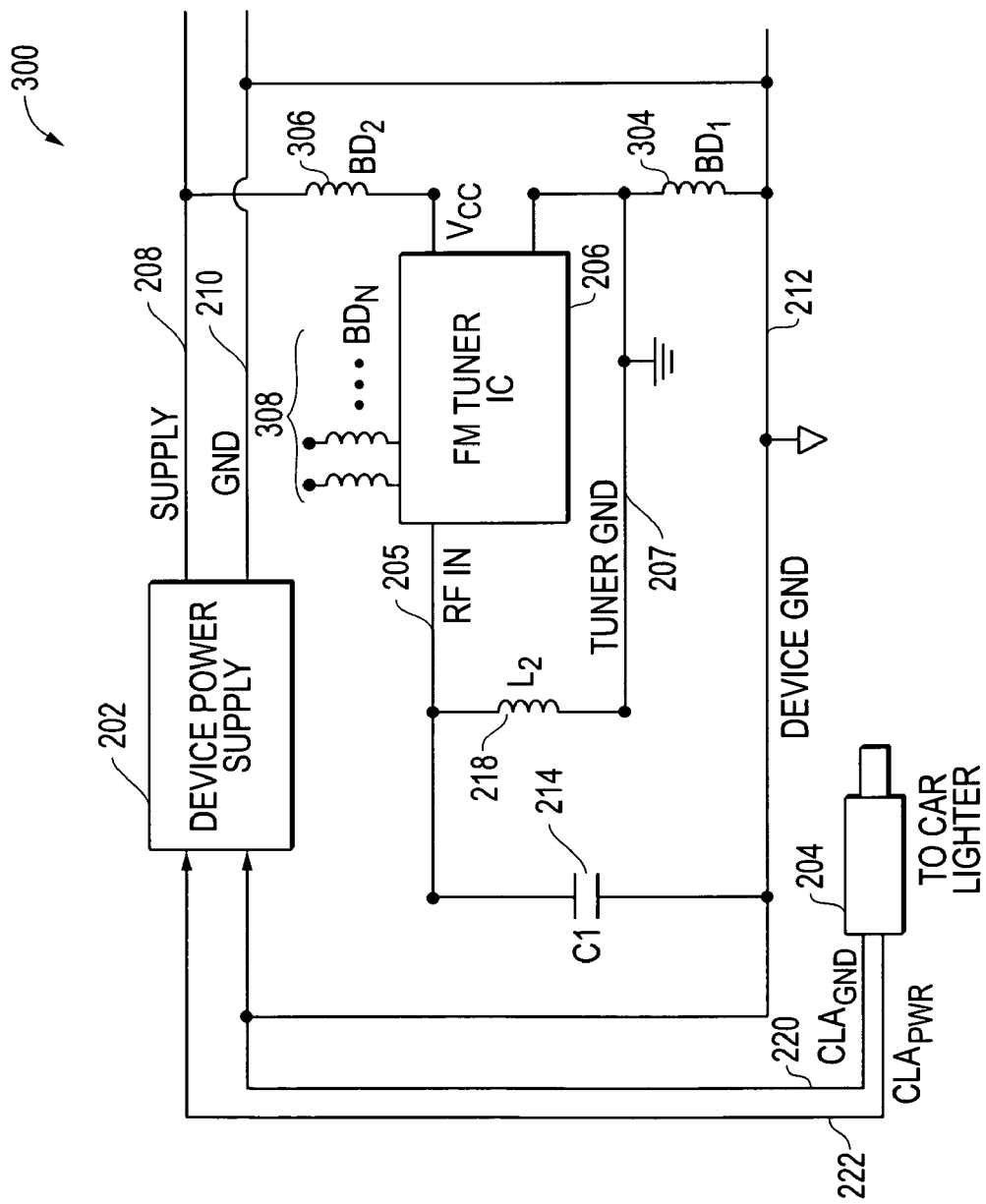
FIG. 3 is a circuit diagram for an embodiment where ground isolation is provide between the device ground and the FM tuner ground so that the large isolation inductor (L1) is not required.

FIG. 3 is a circuit diagram for an embodiment 300 that provides isolation between the device ground 212 and the FM tuner ground 207. For example, as depicted, embodiment 300 utilizes one or more ferrite beads ($BD_1, BD_2 \ldots BD_N$) coupled between pins on the FM tuner IC 206 as isolation elements to provide isolation between the FM tuner IC 206 and the device circuitry. In operation, the ferrite beads provide inductive isolation allowing for the ground signal line to be used as an antenna without requiring the large isolation inductor (L1) required by prior solutions. Other isolation elements could also be utilized if desired.

Figure 2:
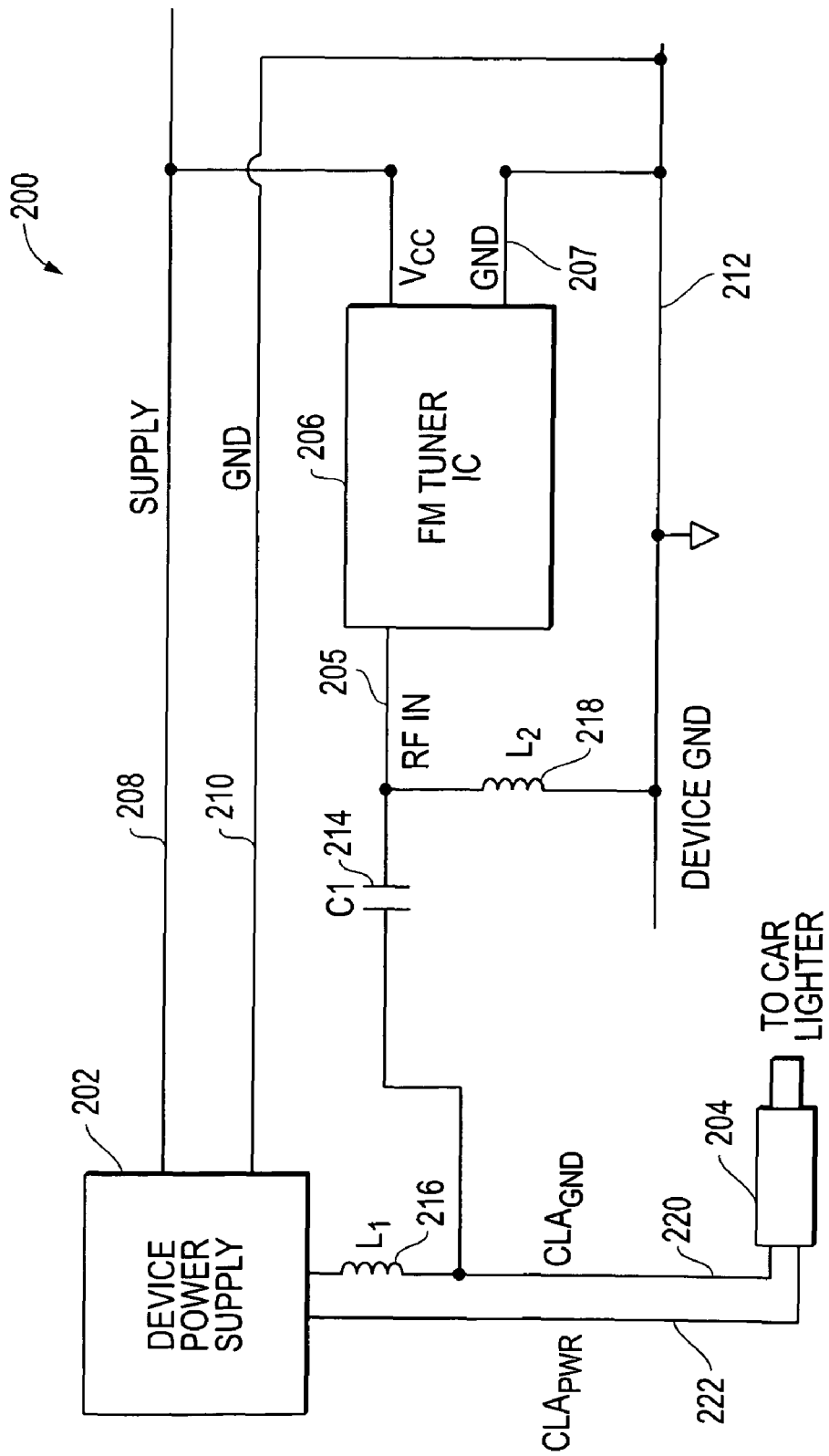
FIG. 2 (Prior Art) is a circuit diagram for a prior solution where a large isolation inductor (L1) is required where the ground line is used as an FM antenna.

As with embodiment 200 of FIG. 2 (Prior Art), for the embodiment 300 of FIG. 3, the ground signal line ($CLA_{GND}$) 220 for the CLA is used as an antenna for an FM tuner IC 206. The CLA includes a connector 204 that is configured to be inserted into a lighter within a vehicle. The CLA also includes a power signal line ($CLA_{PWR}$) 222 and a ground signal line ($CLA_{GND}$) 220 that are coupled to a device power supply 202. The device power supply 202 then provides a supply voltage 208 and a ground 210 to the device. The supply 208 also provides a supply voltage (Vcc) to the FM tuner integrated circuit (IC) 206. The ground 210 is used to provide the device ground 212. The RF input (RF IN) 205 for the FM tuner IC 206 is coupled to the CLA ground ($CLA_{GND}$) signal line 220 through capacitor (C1) 214. In addition, a shunt inductor (L2) 218 is coupled between the RF input (RF IN) 205 and the device ground 212.

In contrast with embodiment 200 of FIG. 2 (Prior Art), for the embodiment 300, the FM tuner ground 207 is isolated from the device ground 212 using one or more isolation elements. As depicted, a ferrite bead ($BD_1$) 304 is coupled between the tuner ground 207 and the device ground 212. Similarly, a ferrite bead ($BD_2$) 306 is coupled between the tuner supply voltage (Vcc) and the supply 208. Further, additional ferrite beads ($BD_N$) 308 can also be coupled between other pins (e.g., control lines) of the FM tuner IC 206 and the device circuitry. In this way, the large isolation inductor (L1) required by the prior solution of FIG. 2 (Prior Art) is not needed. The embodiments described herein thereby provide significant advantages when it is desired to utilize a ground signal line for an FM antenna, such as utilizing the ground signal line for a CLA as the FM antenna for an FM tuner IC within a portable electronic systems.

It is noted that the device circuitry 102 and the FM tuner IC 206 can be coupled to a printed circuit board (PCB) within a device housing. In such an embodiment, printed signal lines on the PCB that are associated with the device ground 212 can also be used as an antenna. Thus, even if a CLA is not attached to the device, these ground signals lines on the PCB can be used as an FM antenna for the FM tuner IC 206.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A portable electronic system, comprising
   device circuitry having a device ground, the device ground comprising a ground signal line;
   an FM tuner integrated circuit (IC) having a tuner ground and a radio frequency (RF) input, the RF input being coupled to use the ground signal line as an antenna, and the FM tuner IC being configured to tune RF signals received at the RF input using the ground signal line; and
   an isolation element coupled between the device ground and the tuner ground to provide ground isolation for the FM tuner IC.

2. The portable electronic system of claim 1, further comprising a car lighter adapter coupled to the device circuitry, the car lighter adapter comprising an adapter ground signal line coupled to the ground signal line.

3. The portable electronic system of claim 2, wherein the isolation element comprises a ferrite bead coupled between the device ground and the tuner ground.

4. The portable electronic system of claim 3, further comprising additional ferrite beads coupled between pins of the FM tuner IC and the device circuitry.

5. The portable electronic system of claim 1, wherein the device circuitry comprises circuitry coupled to a printed circuit board (PCB).

6. The portable electronic system of claim 5, wherein the ground signal line comprises printed signal lines on the PCB.

7. The portable electronic system of claim 1, further comprising a blocking capacitor coupled between the RF input and the ground signal line.

8. The portable electronic system of claim 1, further comprising a shunt inductor coupled between the RF input and the tuner ground.

9. The portable electronic system of claim 1, wherein the device circuitry comprises circuitry configured to operate as a personal navigation device.

10. The portable electronic system of claim 1, wherein the device circuitry comprises circuitry configured for use within a vehicle.

11. A method for receiving radio frequency (RF) signals in a portable electronic system, comprising
providing device circuitry having a device ground and an FM tuner integrated circuit (IC) having a tuner ground, the tuner ground being isolated from the device ground by an isolation element, and the device ground comprising a ground signal line;
using the ground signal line as an antenna to receive radio frequency (RF) signals at an RF input for the FM tuner IC; and
tuning the RF signals received at the RF input.

12. The method of claim 11, further comprising coupling a car lighter adapter to the device circuitry so that an adapter ground signal line within the car lighter adapter is coupled to the ground signal line.

13. The method of claim 12, wherein the isolation element comprises a ferrite bead coupled between the device ground and the tuner ground.

14. The method of claim 13, further comprising additional ferrite beads coupled between pins of the FM tuner IC and the device circuitry.

15. The method of claim 11, wherein the device circuitry comprises circuitry coupled to a printed circuit board (PCB).

16. The method of claim 15, wherein the ground signal line comprises printed signal lines on the PCB.

17. The method of claim 11, wherein a blocking capacitor is coupled between the RF input and the ground signal line.

18. The method of claim 11, further comprising a shunt inductor coupled between the RF input and the tuner ground.

19. The method of claim 11, further comprising operating the device circuitry as a personal navigation device.

20. The method of claim 11, further comprising operating the device circuitry within a vehicle.

* * * * *